United States Patent
Hori

(10) Patent No.: US 6,886,479 B1
(45) Date of Patent: May 3, 2005

(54) SEWING METHOD TO FORM A TRIM COVER ASSEMBLY AND AUTOMOTIVE SEAT USING THE TRIM COVER ASSEMBLY

(75) Inventor: Takuya Hori, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 106 days.

(21) Appl. No.: 10/706,973

(22) Filed: Nov. 14, 2003

(51) Int. Cl.$^7$ .............................................. D05B 15/00
(52) U.S. Cl. .............................. 112/475.06; 112/475.08; 112/470.27
(58) Field of Search ................. 112/475.06, 476.08, 112/470.27, 28, 137, 423; 280/743.1; 2/243.1, 275; 29/91, 91.1, 91.5, 91.6

(56) References Cited

U.S. PATENT DOCUMENTS

| | | | | |
|---|---|---|---|---|
| 1,862,377 A | * | 6/1932 | Harper | 112/424 |
| 5,114,180 A | * | 5/1992 | Kami et al. | 280/743.1 |
| 5,492,073 A | * | 2/1996 | Abraham | 112/441 |
| 5,732,641 A | * | 3/1998 | Kawasaki | 112/470.07 |
| 6,116,175 A | * | 9/2000 | Ito | 112/475.06 |

FOREIGN PATENT DOCUMENTS

JP      2002-079852 A      3/2002

* cited by examiner

Primary Examiner—Ismael Izaguirre
(74) Attorney, Agent, or Firm—Browdy and Neimark, P.L.L.C.

(57) ABSTRACT

A sewing method to form a trim cover assembly for automotive seat, and an automotive seat using the trim cover assembly. Firstly, a first cover material, a second cover material and a backing tape are used and juxtaposed on one another, with their ends aligned with one another, and then sewn together to create a first seam and a sewn connection portion. Such sewn connection portion is cut off into a shortened sewn connection portion. Thereafter, the first cover material and backing tape are turned over relative to the shortened connection portion and sewn together, thereby forming one portion of the trim cover assembly. Another portion of the trim cover assembly may be formed by avoiding use of the backing tape and simply turning over the first cover material relative to the sewn connection portion, and sewing together the thus-turned portions of the first cover material.

10 Claims, 3 Drawing Sheets

SEWING METHOD TO FORM A TRIM COVER ASSEMBLY AND AUTOMOTIVE SEAT USING THE TRIM COVER ASSEMBLY

BACKGROUND OF THE INVENTION

1. Field of the Invention

The present invention relates to a method for sewing together separate cover materials to form a trim cover assembly for automotive seat and also to an automotive seat using such trim cover assembly.

2. Description of Prior Art

In general, the process for producing an automotive seat involves the step of securely attaching a trim cover assembly to a foam padding which forms a body of the seat. Some of such trim cover assemblies are formed from a natural leather material (i.e. such animal skin as cow skin or horse skin) or from an artificial leather material.

Both of those natural and artificial leather materials are, however, less elastic or less extendable and relatively high in stiffness. Such non-flexible property has made it difficult to neatly bend a small local part of the material to form a small bent region therein. In other words, two separate cover materials, no matter of whether they may be a natural leather or artificial leather, are sewn together along their respective end portions, forming a seam therealong, with a certain margin to the seam, and then, the two cover materials are folded outwardly and turned over relative to the seam, such that two end portions respective of the sewn two cover materials, which correspond to the said margin, are defined between the two cover materials, projecting inwardly thereof. In that way, a trim cover assembly with a turned-over corner portion is produced, in which the two end portions of cover materials project inwardly thereof and extend along the seam. Normally, such trim cover assembly is securely attached on the surface of foam padding to produce a complete body of automotive seat, such that the corner portion of the trim cover assembly covers a corresponding corner portion of the foam padding.

However, the foregoing inwardly projected end portions of the trim cover assembly contact and erect on the corner portion of foam padding, thus resulting in objectionable irregular protuberant portions being formed on the outer surface of trim cover assembly and also resulting in an undesired sinuous formation of the seam on the corner portion of the trim cover assembly.

Incidentally, some of the automotive seats are provided with side air bags in one or two lateral bolster portions thereof. A trim cover assembly used on such seat is basically formed by sewing together a seating or back support cover section and at least one lateral bolster cover section, wherein the seating or back support cover section is adapted to cover a corresponding foam padding area for supporting a buttocks or back portion of passenger, and the lateral bolster cover section is adapted to cover at least one lateral bolster are of foam padding for supporting one lateral side of the passenger's body including his or her arms. For the purpose of allowing for inflation of the side air bag, a tear-out or breakable portion is defined in a proper region along a seam between the seating cover section and the lateral bolster cover section, with a stay cloth being sewn with a margin given to that seam at a region substantially corresponding to the breakable portion. With this arrangement, upon inflation of the side air bag, the breakable portion is easily broken and opened due to the stay cloth giving an additional force enough to tear away the seam in conjunction with an outwardly expanding force of the inflated side air bag, so that the air bag may protrude through the opened portion and inflate outwardly therefrom. However, such conventional arrangement has been found defective in involving a troublesome step of providing the stay cloth and sewing the same with the trim cover assembly, which in turn makes the trim cover assembly complicated in structure.

In order to avoid the foregoing drawbacks, one can contemplate on trimming away the the end portions of the two cover sections (or two cover materials) corresponding to a margin to seam so as to provide a small margin to be sewn. With this trimming, it is indeed possible to prevent the above-noted formation of irregular protuberant portions on the corner portions of trim cover assembly. But, practically, it is impossible to use a sewing machine to sew together the end portions of two cover sections in such small margin, because the margin given therein is too small for stable and precise sewing by the sewing machine and also can hardly be retained by a retaining member of the sewing machine. As a result thereof, the two cover sections (or two cover materials) can not be sewn together completely, and thus, it is highly possible that the sewn portion or seam between them will be easily teared away and opened, giving a poor appearance of trim cover assembly.

SUMMARY OF THE INVENTION

In view of the above-stated drawbacks, it is a purpose of the present invention to provide an improved sewing method to form a trim cover assembly for automotive seat, which effectively prevents formation of the abovementioned objectionable irregular projected portions and sinuous seam on the outer surface of trim cover assembly and prevents the sewn portion there from being torn away and opened, while improving the outer appearance of seat aesthetically.

In order to achieve such purpose, in accordance with the present invention, there is basically provided a sewing method to form a trim cover assembly for automotive seat, which comprises the steps of:

providing a first cover material having an outer side, a reverse side; and an end;

providing a second cover material having an outer side, a reverse side, and an end;

providing a reinforcing material having one end;

placing the second cover material on the reinforcing material, such that the reverse side of the second cover material is contacted with the reinforcing material, while the end of the second cover material is aligned with the end of the reinforcing material;

then, placing the first cover material on the second cover material such that the outer side of the first cover material is contacted with the outer side of the second cover material, while the end of the first cover material is aligned with the thus-aligned two ends of the second cover material and reinforcing material;

sewing together the thus-juxtaposed first and second cover materials and reinforcing material along a given first sewing line, so that a sewn connection portion is defined therein, with a first seam and a margin to the first seam being created in the sewn connection portion;

cutting off the sewn connection portion into a shortened sewn connection portion, thus transforming the margin into a reduced margin;

thereafter, turning over the reinforcing material relative to the first seam in a direction to the reduced margin;

also turning over the first cover material relative to the first seam in a direction to the reduced margin, so that the reverse side of the first cover material is placed on the reinforcing material and that the shortened sewn connection portion is disposed inwardly of and between the thus-turned-over first cover material and reinforcing material; and then, sewing together both the first cover material and the reinforcing material along a given second sewing line, whereupon there are defined one sewn unit of the first cover material and the reinforcing material and a remaining portion of the second cover material in relation to the shortened sewn connection portion, with a second seam being created on the outer side of the first cover material.

In is a second purpose of the present invention to facilitate the ease with which the sewn portion or seam in an area of the trim cover assembly covering a portion of the seat in which a side air bag is provided, thereby allowing the side air bag to easily inflate and tear away the seam to protrude outwardly therefrom.

For that purpose, in accordance with the invention, subsequent to the foregoing step of sewing together both first cover material and reinforcing material along the given second sewing line, there are provided the steps of:

avoiding use of the reinforcing material;

leaving the first cover material placed on the second cover material, with the outer side of the former in contact with the outer side of the latter, and also with the end of the former being aligned with the end of the latter;

sewing together the first and second cover materials along the given first sewing line, so that a sewn connection portion is defined therein, with the first seam and a margin to the first seam being created in the sewn connection portion, whereupon one end portion and a main body portion are defined relative to the sewn connection portion in the first cover material;

thereafter, turning over the main body portion of the first cover material relative to the sewn connection portion in a direction to the end portion of the first cover material, so that a reverse side of the main body portion is contacted with a reverse side of the end portion, wherein the reverse sides respective of the main body portion and end portion both correspond to the reverse side of the first cover material; and then, sewing together the thus-juxtaposed main body portion and end portion along the given second sewing line, thereby defining one sewn unit of the first cover material, with a second seam being created on the outer side of the first cover material, whereby there is formed a portion of the trim cover assembly which is adapted to cover the area in which the side air bag is provided.

Other features and advantages of the present invention will become apparent from reading of the descriptions hereinafter, with reference to the accompanied drawings.

DETAILED DESCRIPTION OF PREFERRED EMBODIMENT OF THE INVENTION

Figure 1:
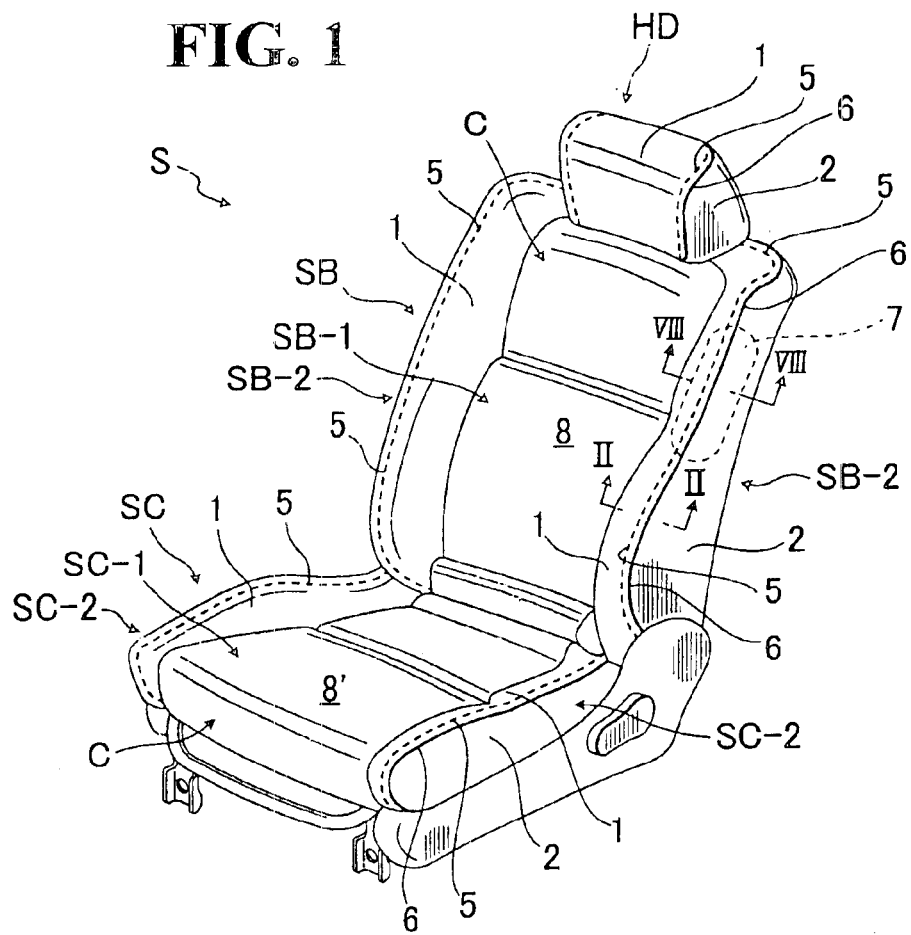
FIG. 1 is a schematic perspective view of an automotive seat covered with a trim cover assembly formed by a sewing method of the present invention.
Figure 2:
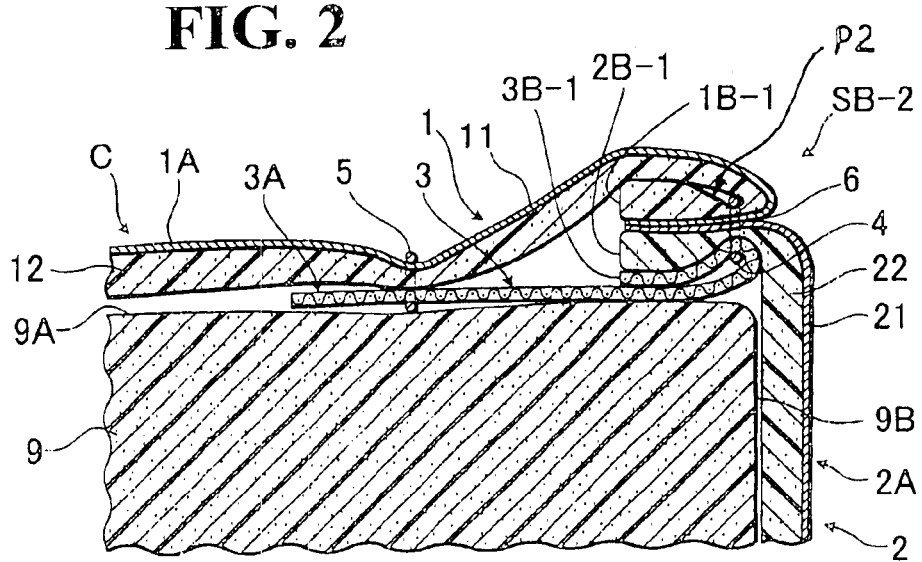
FIG. 2 is a sectional view taken along the line II—II in the FIG. 1.
Figure 7:
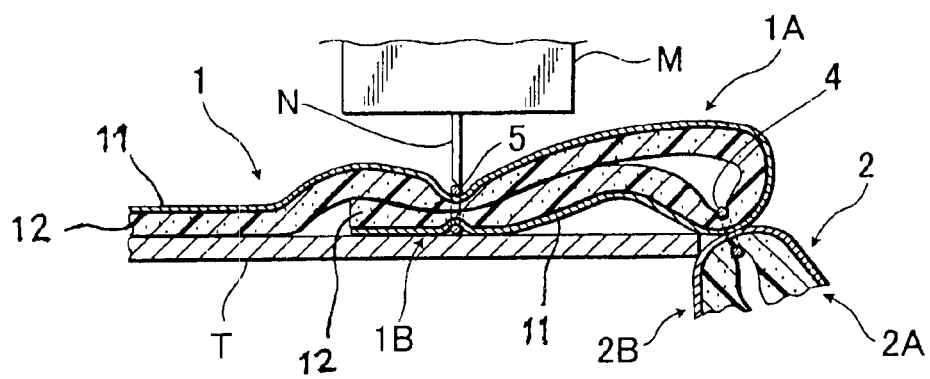
FIG. 7 is a fragmentary sectional view which explanatorily shows the step for sewing together the turned-over and juxtaposed portions of the first cover material.
Figure 8:
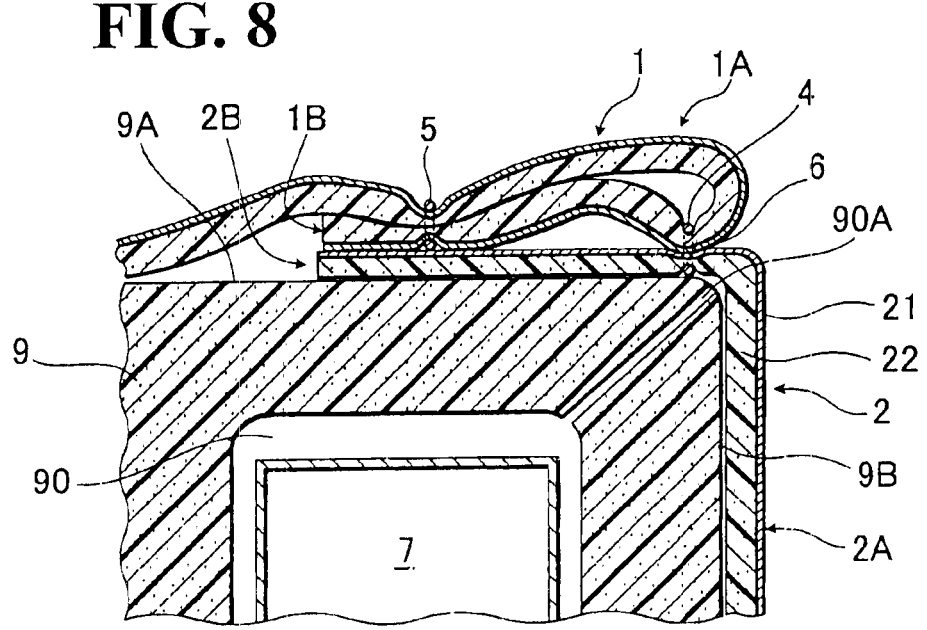
FIG. 8 is a sectional view taken along the line VIII—VIII in the FIG. 1.

FIGS. 1, 2 and 8 illustrate one exemplary mode of automotive seat (S) with a headrest (HD) provided thereon in accordance with the present invention, wherein both automotive seat (S) and headrest (HD) include a novel trim cover assembly generally designated by (C). FIGS. 3 to 7 show sewing processes for forming the trim cover assembly (C) in accordance with the present invention.

The illustrated seat (S) comprises a seat back (SB) and a seat cushion (SC). As shown in FIG. 1, the seat back (SB) is basically formed by a main backrest portion (SB-1) and a pair of lateral bolster portions (SB-2), and likewise, the seat cushion (SC) is basically formed by a main seating portion (SC-1) and a pair of lateral bolster portions (SC-2).

As far as the seat back (SB) is concerned, referring to FIG. 1, the trim cover assembly (C) covering the seat back (SB) comprises: a first cover material (1); a second cover material (2); and a third cover material (8). The first and second cover materials (1) and (2) are sewn together to form one section of trim cover assembly adapted to cover each of the pair of lateral bolster portions (SB-2). On the other hand, the third cover material (8) is adapted to cover the main backrest portion (SB-1) and sewn with the first cover material (1). It is noted that each cover material used is relatively stiff natural or artificial leather including a leather material formed from a cow skin or a horse skin, or may be of a two-layer lamination type comprising such leather layer and foam wadding layer as shown in FIG. 2.

Now, reference is made to FIG. 2 illustrating a fragmentary section taken along the line II—II in FIG. 1 corresponding to a local corner part of one of the two lateral bolster portions (SB-2) associated with the seat back (SB). Designation (9) denotes a foam padding, one of constituent elements forming the lateral bolster portion (SB-2). In this embodiment, the first and second cover materials (1) (2) are each of a two-layer lamination type. Namely, the first cover material (1) comprises: an outer cover layer (11) of a natural or artificial leather material; and an inner foam wadding layer (12) fixed to the reverse side of that outer cover layer (11). Likewise, the second cover material (2) comprises: an outer cover layer (21) of a natural or artificial leather material; and an inner foam wadding layer (22) fixed to the reverse side of that outer cover layer (21). This is however not limitative, but both first and second cover materials (1) (2) may be formed from only one layer of cover material including a natural or artificial leather material.

Figure 3:
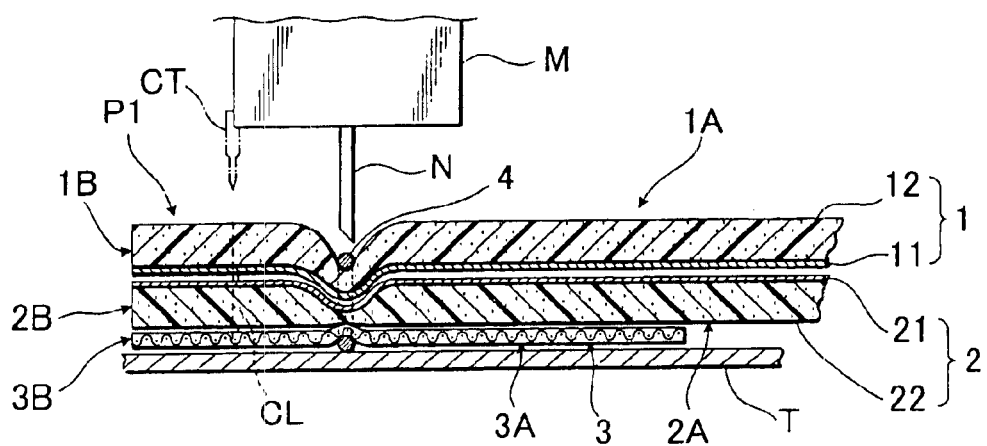
FIG. 3 is a fragmentary sectional view which explanatorily shows the step for sewing together first and second cover materials and backing tape.

FIG. 2 shows, in section, a first local area in the portion of trim cover assembly (C) which is adapted to cover the later bolster portion (SB-2). In accordance with the present invention, a reinforcing material is used in such first local area so as to line and reinforce the sewn connection portion (at P2 in FIG. 5) between the first and second cover materials (1) (2). The reinforcing material may be one piece of backing tape (3) (or one strip of back cloth), for example, which is made of such a material that can be subjected to sewing by a sewing needle. In brief, as shown in FIG. 3, that particular first local area is formed by sewing together the two end portions (1B-1) (2B-1) respective of the first and second cover materials (1B) (2B) and one end portion (3B-1) of the backing tape (3), using a first thread (4), and then, sewing together the first cover material (1) and the backing tape (3). But, as can be seen from FIG. 1, there is another second local area of the trim cover assembly (C) corresponding to the lateral bolster portion (SB-2), which is continuous and integral with the foregoing first local area. This second local area does not require the backing tape (3) and is adapted to cover the corresponding local area of the foam padding (9) in which the side air bag (7) is provided, as will be elaborated later.

Now, a more specific description will be made of how to form the foregoing first local area of trim cover assembly (C) by use of a known sewing machine (M), with reference to FIGS. 3 to 5.

Reference is now made to FIG. 3. First of all, the backing tape (3) is placed on the table (T) of a sewing machine (M) at a predetermined sewing point under the sewing needle (N) of the sewing machine (M). Then, a given portion of the second cover material (2), corresponding to the first local area mentioned above, is juxtaposed on that backing tape (3) and table (T), so that the foam wadding layer (22) of the second cover material (2) overlies those backing tape (3) and table (T). After then, the outer cover layer (11) of the first cover material (1) which has been turned upside down to expose its foam wadding layer (12) upwardly is juxtaposed on the outer cover layer (21) of the second cover material (2). At this point, as shown, the ends (1B) (2B) respectively of the fist and second cover materials (1) (2) are aligned with an end (3B) of the backing tape (3). Thereafter, all those backing tape (3) and first and second cover materials (1) (2) are sewn together by the sewing machine (M), such that a seam created by the first thread (4) extends alongside of their ends (3B) (1B) (2B), giving a certain margin (P1) to the seam, as normally done by the conventional sewing machine (M). After completion of the sewing, the margin (P1) is cut along a predetermined line (CL) to cut away excessive end portions (1B-2) (2B-2) (3B-2) of those three materials (1) (2) (3), thereby providing a reduced margin (P2) with respect to the seam (at 4) as shown in FIG. 4. In this respect, preferably, as indicated by the one-dot chain lines in FIG. 3, a cutter (CT) provided on the sewing machine (M) may be actuated in order that, while the first and cover materials (1) (2) are being sewn together by the sewing machine (M), the margin (P1) formed thereby is simultaneously cut off by the cutter (CT) along the line (CL).

At the present stage, it is observed that, in the thus-sewn trim cover assembly unit, a main body portion (1A) of the first cover material (1), a main body portion (2A) of the second cover material (2), and a main body portion (3A) of the backing tape (3) are defined, so that those three elements (1A, 2A and 3A) and the margin portion (P1) are defined on the opposite sides of and relative to the first thread or first seam (at 4).

Figure 4:
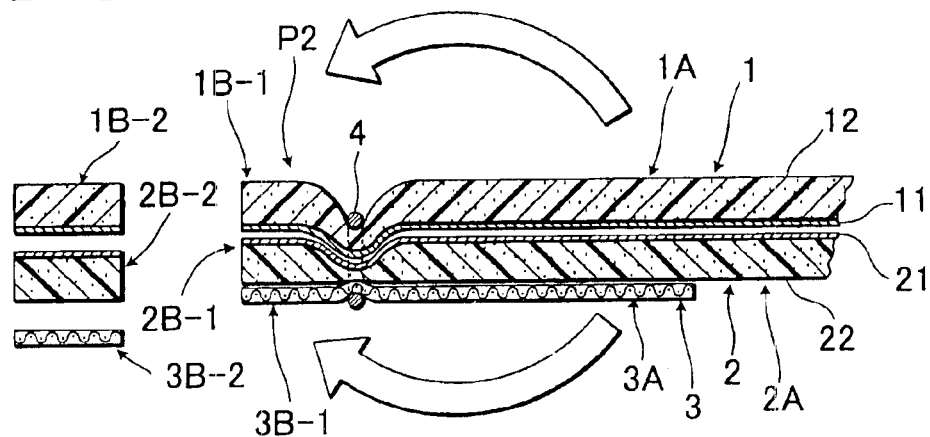
FIG. 4 is a fragmentary sectional view which explanatorily shows the steps for cutting off the ends of the foregoing three materials and turning over the first cover material and backing tape relative to a first seam.
Figure 5:
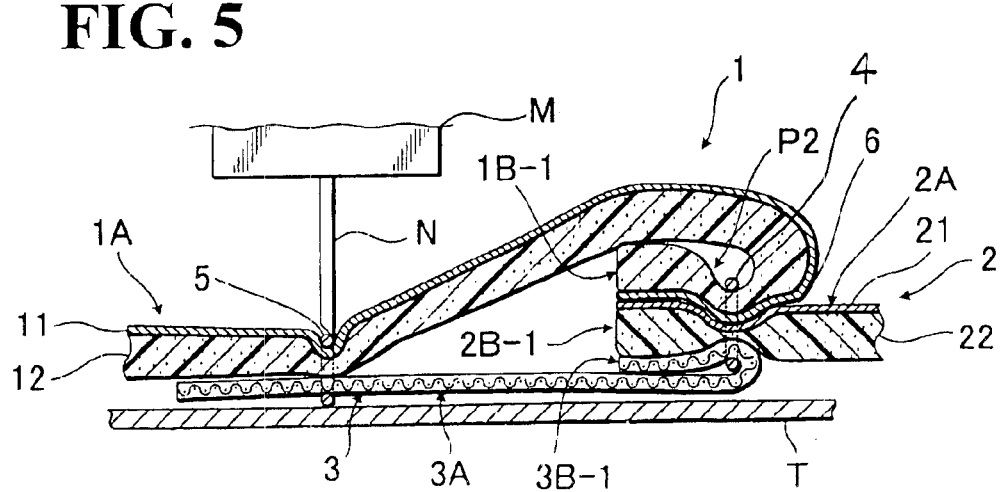
FIG. 5 is a fragmentary sectional view which explanatorily shows the step for sewing together the first cover material and backing tape.

Then, as indicated by the arrow in FIG. 4, the first cover material main body portion (1A) and the backing tape main body portion (3A) are folded away from each other relative to the second cover material main body portion (2A) which extends horizontally without being bent, and further turned over at about 180 degrees relative to the first seam (at 4) in a direction to the reduced margin (P2) as can be seen from FIG. 5. In that way, both first cover material main body portion (1A) and backing tape main body portion (3A) are turned over so as to extend from the first seam (at 4) along a substantially horizontal plane in one direction, whereas on the other hand, the second material body portion (2A) extends form the first seam (at 4) in another direction opposite to those two elements (1A) (3A).

Thereafter, as shown in FIG. 5, the thus-turned-over backing tape main body portion (3A) and the second cover material main body portion (2A) are placed on the table (T). Subsequent thereto, the first cover material main body portion (1A), which has been turned over to a point above the backing tape main portion (3A), is juxtaposed on that particular backing tape main portion (3A), and then, those two materials (1A) (3A) are sewn together by the sewing machine (M) along a predetermined second sewing line, with a certain distance from the first thread or seam (at 4), as in FIG. 5.

As a result of the above-described sewing process, there is produced the first local area of trim cover assembly unit adapted to cover the corresponding area of the lateral bolster portion (SB-2) of seat back (SB) excepting the above-noted second local area of that trim cover assembly unit. As illustrated, advantageously, a decorative groove (6) is formed along the sewn corner portion of trim cover assembly unit corresponding to the first seam (at 4) and a second decorative seam (5) is defined alongside of such sewn corner portion.

As understandable from FIG. 2, the thus-formed trim cover assembly unit is securely attached to the foam padding (9) configured in an outer shape of the lateral bolster portion (SB-2) by attaching both first cover material (1) and backing tape (3) to the frontal wall (9A) of the foam padding (9) and also attaching the second cover material (2) to the lateral wall (9B) of the foam padding (9). In this regard, though not shown, some suitable means are used to securely attach the trim cover assembly unit to the foam padding (9). Such anchoring means, for example, may comprise hog rings fixedly provided in the foam padding (9) and anchor cloths fixed to the trim cover assembly, and the anchor cloths may be engaged with the hog rings to thereby securely attach the trim cover assembly unit to the foam padding (9). Of course, the free end of the first cover material main portion (1A) is sewn with one end of the third cover material (3), as can be seen from both FIGS. 1 and 2.

With the above-described sewing processes, It is appreciated that the following advantages are obtained:

(i) The first margin or projection (P1), which is defined by the first step of sewing together the backing tape (3) and the first and second cover materials (1) (2), using the first thread (4), can be cut off into a desirably reduced length of margin or projection (P2). Thus, it is possible to not only allow for using any conventional sewing machine to sew together the first and second cover materials (1) (2) with a sufficient margin to seam on which the pressing feed element of the sewing machine is stably contacted, but also minimize objectionable projected points on the outer surface of trim cover assembly (C), which is caused by a conventionally formed margin or projection of a relatively large length in the sewn portion of trim cover assembly unit. In this regard, the reduced margin or projection (P2) does not result in tearing away of the sewn portion or seam (at 4) because the backing tape (3) is sewn with the reduced margin (P2) and serves to reinforce that sewing portion (at 4) against tear.

(ii) As can be seen from FIG. 2, the reduced margin or projection (P2) is inclined and leaned to one side near to the frontal wall (9A) of foam padding (9) or completely reposes thereagainst, due to the fact that both first cover material (1) and backing tape (3) are sewn together via the second thread (5) and stretched outwardly on the foam padding (9), which forcibly inclines the projection (P2) or forcibly reposes the same against the foam padding (9). This effectively prevents objectionable sinuous projection portions from being created on the outer surface of the trim cover assembly (C) which has been found in the prior art as described previously.

(iii) Since the first cover material (1) and backing tape (3) are turned over relative to the first sewn portion (at 4) and sewn together along a sewing line corresponding to the second sewn portion (at 5), a stretching force imparted through the first cover material (1) is dispersed and weakened in such two sewn elements (1) and (3), thus serving to positively prevent the sewn portion (at 4) from being torn away and opened. Further, the second thread or seam (5) serves as an additional decorative seam, thereby aesthetically improving an outer appearance of the seat as a whole.

Turning now back to FIG. 1, as stated earlier, the seat back (SB) is provided with a side air bag (7) in one or both of the two lateral bolster portions (SB-2) thereof. As is known, in the case of a collision or emergency, the side air bag (7) will automatically inflate and tear the corresponding portion of seat back (SB) to project outwardly therefrom to thereby protect a lateral body portion of a passenger on the seat (S) against damage or injury.

Figure 6:
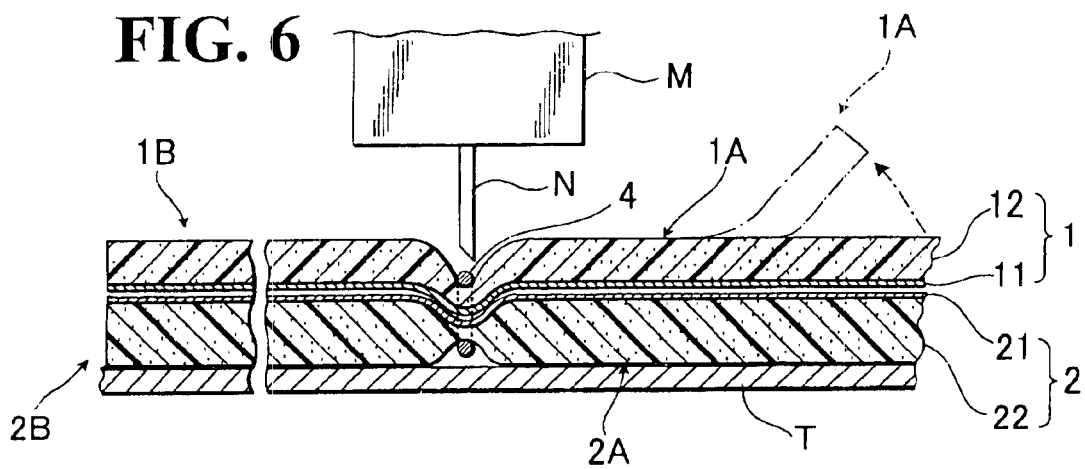
FIG. 6 is a fragmentary sectional view which explanatorily shows the step for sewing together first and second cover materials and backing tape.

Reference is made to FIGS. 6 and 8. In those figures, there is shown a sewing process for forming the second local area of trim cover assembly (C) adapted to cover the corresponding local area of the foam padding (9) in which the side air bag (7) is provided. However, it is noted that both first and second local areas of trim cover assembly (C) mentioned above are continuous and integral with each other in one trim cover assembly (C) as understandable from FIG. 1. In view of such unitary nature of trim cover assembly (C), subsequent to the above-described process for forming the first local area of the trim cover assembly (C), a remaining portion of the second cover material (2), corresponding to the foregoing second local area, is placed upon the table (T), with the foam wadding layer (22) thereof overlaying and contacting the upper surface of table (T). In the present process, the backing tape (3) or any other reinforcing material is not used, needless to mention. On the other hand, a predetermined portion of the first cover material (1) corresponding to that second local area is turned upside down to expose its foam padding layer (12). Then, the outer cover layer (11) thereof is juxtaposed and contacted on the outer cover layer (21) of the second cover material (2), such that the end (at 1B in FIG. 6) of the first cover material (1) is aligned with the end (at 2B in FIG. 6) of the second cover material (2).

Then, as in FIG. 6, the thus-juxtaposed portions of first and cover materials (1) (2) are both sewn together by the sewing machine (M), using the foregoing first thread (4) as it is, along substantially the same sewing line as the one for the previously described first sewing process. As a result thereof, defined in the first cover material (1) are an end portion (1B) and a main body portion (1A) on the opposite sides of the first seam (at 4), and, likewise, defined in the second cover material (2) are an end portion (1B) and an end portion (2B) and a main body portion (2A) on the opposite sides of the first seam (at 4).

Thereafter, as indicated by the one-dot chain lines in FIG. 6 and as understandable from FIG. 7, the first cover material main body portion (1A) is folded and turned over relative to the first seam (at 4) by 180 degrees, so that the foam wadding layer (12) thereof is placed on the foam wadding layer (12) of the first cover material end portion (1B). As viewed from the FIG. 7, the first cover material main body portion (1A) per se is longer than the first cover material end portion (1B) and thus extends long therefrom to the right side.

As shown in FIG. 7, both second cover material main body and end portions (2A) (2B) are folded or turned over toward each other relative to the first seam (at 4) and isolated from the thus-juxtaposed first cover material main body and end portions (1A) (1B). As shown, those two second cover material portions (2A) (2B) (i.e. a whole of the second cover material (2)) are preferably hanged from the end of the table (T) in a manner pendent from the juxtaposed first cover material portions (1A) (1B) to facilitate the ease of the sewing operation of the sewing machine (M). Thereafter, the sewing machine (M) is operated to sew together the first cover material main body and end portions (1A) (1B), using the foregoing second thread (5) as it is, along substantially the same sewing line as the one for the previously described first sewing process, which is distant from the first sewing portion or seam (at 4).

After the completion of the foregoing sewing, as shown in FIG. 8, there is produced the second local area of trim cover assembly unit adapted to cover the corresponding area of the lateral bolster portion (SB-2) of seat back (SB) excepting the first local area of that trim cover assembly unit. As illustrated, advantageously, a decorative groove (6) is formed along the sewn corner portion of trim cover assembly unit corresponding to the first seam (4) and a second decorative seam (5) is defined alongside of such sewn corner portion.

FIG. 8 depicts the foam padding (9) (of course, it corresponds to the lateral bolster portion (SB-2)) to have the second local area in which is formed a hollow (90) for accommodating the side air bag (7) therein and a slit (90A) through which the side air bag (7) will inflate and protrude outwardly of the foam padding (9), wherein the slit (90A) is formed in a corner portion of the foam padding (9) as shown. While not clearly shown, such slit (90A) is generally equal in length to the side air bag (7) so that the whole of the inflated side air bag (7) will easily pass through the slit (90A) and protrude outside of the foam padding (9).

As understandable from the FIG. 8, the thus-formed trim cover assembly unit is secured to the afore-stated second local area of foam padding (9) by attaching both first cover material (1) and second cover material end portion (2B) to the frontal wall (9A) of the foam padding (9) and also attaching the second cover material main portion (2A) to the lateral wall (9B) of the foam padding (9). In this regard, though not shown, some suitable means are used to securely attach the trim cover assembly unit to the foam padding (9). Such anchoring means, for example, may comprise hog rings fixedly provided in the foam padding (9) and anchor cloths fixed to the trim cover assembly, and the anchor cloths may be engaged with the hog rings to thereby securely attach the trim cover assembly unit to the foam padding (9).

Needless to mention, the free end of the first cover material main portion (1A) is sewn with one end of the third cover material (3), as can be seen from FIGS. 1 and 8.

With the above-described sewing processes, It is appreciated that the following advantages are obtained:

(i) As seen in FIG. 8, only the second cover material (2) overlies the corner portion of foam padding (9) in which the side air bag (7) is disposed, and further, the first cover material (1) is only sewn with the second cover material end portion (2B) at a point adjacent to the slit (90A). Hence, the inflated side air bag (7), which protrudes and expands through the slit (90A) outwardly of the foam padding (9), can easily tear away the thread (4) and open the connected portion sewn by the thread (4) between the first and second cover materials (1) (2), so that the side air bag (7) will quickly protrude therethrough outwardly from the lateral bolster portion (SB-2) to embracingly protect the lateral body portion of a passenger on the seat (S) against damage and injury.

(ii) Of course, the second thread or seam (5) serves as an additional decorative seam, thereby aesthetically improving an outer appearance of the seat as a whole.

The above described sewing processes may be effected to form the trim cover assembly (C) associated with the seat cushion (SC), or particularly to form one or both the two lateral bolster portions (SC-2) (SC-2) thereof, using a properly preformed first and second cover materials (1) (2) to cover a corresponding foam padding (not shown) configured in a shape of the lateral bolster portion (SC-2).

While having described the present invention so far, it should be understood that the invention is not limited to the illustrated embodiments, but any other modification, replacement and addition will be structurally and methodologically applied thereto within the scopes of the appended claims.

What is claimed is:

1. A sewing method to form a trim cover assembly for automotive seat, comprising the steps of:

providing a first cover material having an outer side, a reverse side; and an end;

providing a second cover material having an outer side, a reverse side, and an end;

providing a reinforcing material having one end;

placing said second cover material on said reinforcing material, such that the reverse side of the second cover material is contacted with the reinforcing material, while said end of the second cover material is aligned with said end of the reinforcing material;

then, placing said first cover material on said second cover material such that the outer side of the first cover material is contacted with the outer side of the second cover material, while said end of the first cover material is aligned with the thus-aligned two ends of the second cover material and reinforcing material;

sewing together the thus-juxtaposed first and second cover materials and reinforcing material along a given first sewing line, so that a sewn connection portion is defined therein, with a first seam and a margin to the first seam being created in the sewn connection portion;

cutting off said sewn connection portion into a shortened sewn connection portion, thus transforming said margin into a reduced margin;

thereafter, turning over said reinforcing material relative to said first seam in a direction to said reduced margin;

also turning over said first cover material relative to said first seam in a direction to said reduced margin, so that the reverse side of the first cover material is placed on said reinforcing material and that the shortened connection portion is disposed inwardly of and between the thus-turned-over first cover material and reinforcing material; and then, sewing together both said first cover material and said reinforcing material along a given second sewing line, whereupon there are defined one sewn unit of the first cover material and the reinforcing material and a remaining portion of said second cover material in relation to said shortened sewn connection portion, with a second seam being created on the outer side of the first cover material.

2. The sewing method as claimed in claim 1, wherein said automotive seat has an area in which at least one side air bag is provided, and wherein, subsequent to the step of sewing together both said first cover material and said reinforcing material along said given second sewing line, the sewing method further comprising the steps of:

avoiding use of said reinforcing material;

leaving said first cover material placed on said second cover material, with the outer side of the former in contact with the outer side of the latter, and also with the end of the former being aligned with the end of the latter;

sewing together said first and second cover materials along said given first sewing line, so that a sewn connection portion is defined therein, with the first seam and a margin to the first seam being created in said sewn connection portion, whereupon one end portion and main body portion are defined relative to said sewn connection portion in said first cover material;

thereafter, turning over said main body portion of said first cover material relative to said sewn connection portion in a direction to said end portion of the first cover material, so that a reverse side of said main body portion is contacted with a reverse side of said end portion, wherein said reverse sides respective of said main body portion and said end portion both correspond to the reverse side of the first cover material; and then, sewing together the thus-juxtaposed main body portion and end portion along said given second sewing line, thereby defining one sewn unit of said first cover material, with a second seam being created on the outer side of said main body portion of the first cover material, whereby there is formed a portion of the trim cover assembly which is adapted to cover said area in which said side air bag is provided.

3. The sewing method as claimed in claim 1, wherein a sewing machine is used to effect the step of sewing together said first and second cover materials and said reinforcing material as well as the step of sewing together said first cover material and said reinforcing.

4. The sewing method as claimed in claim 1, wherein said reinforcing material is a backing tape or a back cloth.

5. The sewing method as claimed in claim 1, wherein a sewing machine provided with a cutter is used to sew together said first and second cover materials and said reinforcing material, while simultaneously operating said cutter to cut off said sewn connection portion, thereby transforming said margin into said reduced margin.

6. The sewing method as claimed in claim 1, wherein said first and second cover materials are each formed from one selected from the groups consisting of an artificial leather material and a natural leather material including an animal skin.

7. The sewing method as claimed in claim 1, wherein said first and second cover materials are each of a two-layer lamination structure comprising an outer cover layer and a foam wadding layer, and wherein said outer cover layer and said foam padding layer respectively correspond to said outer side and said reverse side associated with each of said fist and second cover materials.

8. A trim cover assembly formed by the sewing method as claimed in claim 1, which is used to cover at least one corner portion of an automotive seat in such a manner that said second seam extends alongside of said at least one corner portion and that said shortened sewn connection portion is inclined to or leaned against one surface of said at least one corner portion.

9. The trim cover assembly according to claim 8, wherein said at least one corner portion is a lateral bolster portion of the automotive seat.

10. An automotive seat using the trim cover assembly formed by the method as claimed in claim 1.

* * * * *